Figure 1:
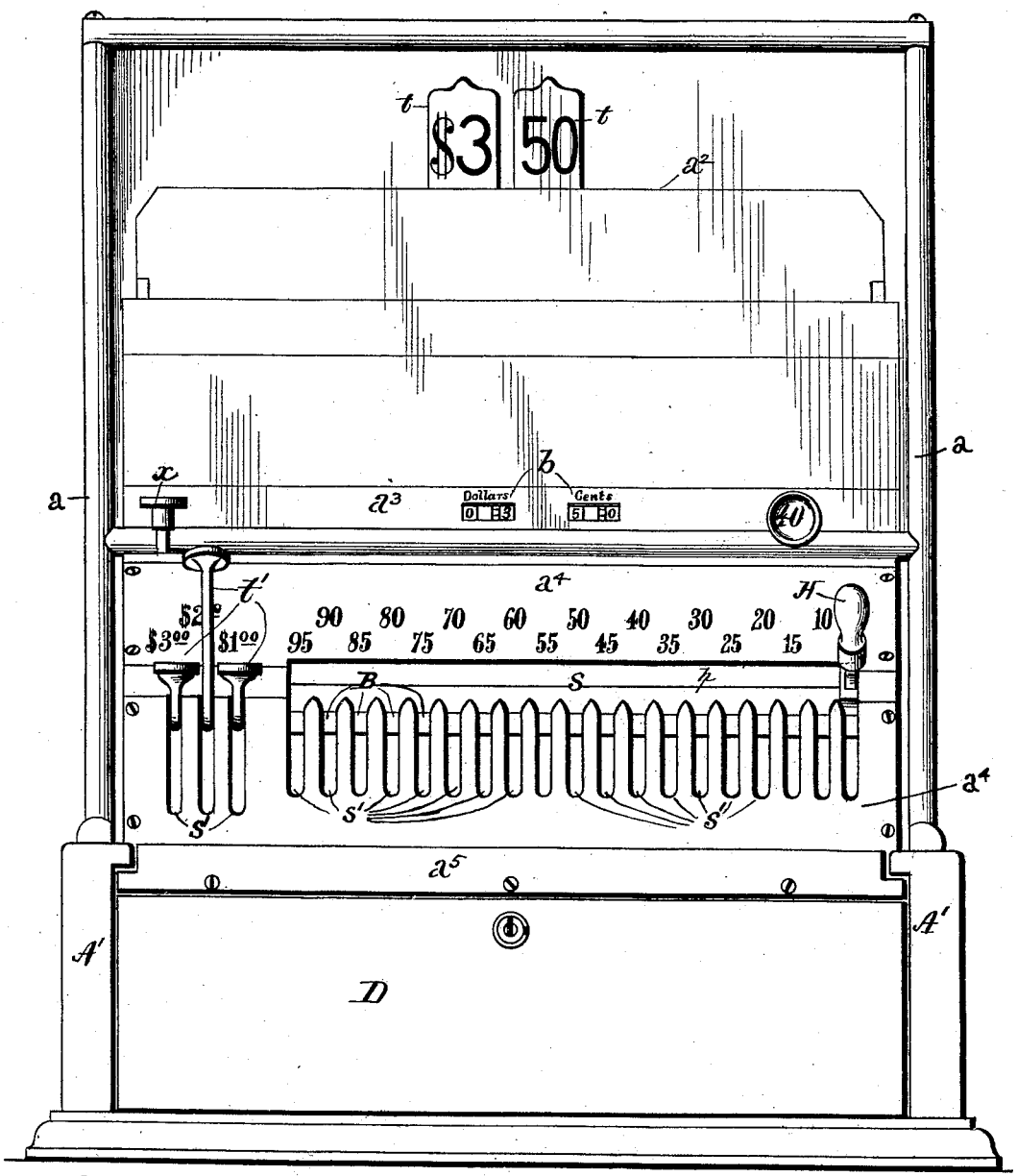

(No Model.)  11 Sheets—Sheet 1.

J. F. PFEFFER.
CASH REGISTER AND INDICATOR.

No. 468,944.  Patented Feb. 16, 1892.

Witnesses:
Frank Huntington
E. Hosea

Inventor:
John F. Pfeffer
By R. M. Hosea
Atty (No Model.) 11 Sheets—Sheet 3.

J. F. PFEFFER.
CASH REGISTER AND INDICATOR.

No. 468,944. Patented Feb. 16, 1892.

Witnesses
Frans Huntington
E. Hosea

Inventor
John F. Pfeffer
By R. W. Hosea
Atty.

(No Model.) 11 Sheets—Sheet 4.

J. F. PFEFFER.
CASH REGISTER AND INDICATOR.

No. 468,944. Patented Feb. 16, 1892.

Fig. 4.

Witnesses:
Robert Burritt
Frank H. Huntington

Inventor:
John F. Pfeffer
By R. M. Hosea
Atty.

(No Model.) 11 Sheets—Sheet 5.
J. F. PFEFFER.
CASH REGISTER AND INDICATOR.
No. 468,944. Patented Feb. 16, 1892.
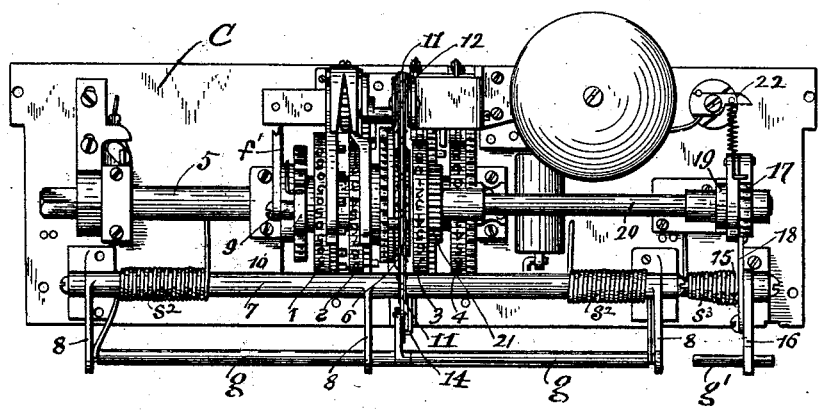
Witnesses
Frank Huntington
E. Hosea
Inventor
John F. Pfeffer
By R. H. Hosea
Atty (No Model.)     J. F. PFEFFER.     11 Sheets—Sheet 6.
CASH REGISTER AND INDICATOR.
No. 468,944.     Patented Feb. 16, 1892.
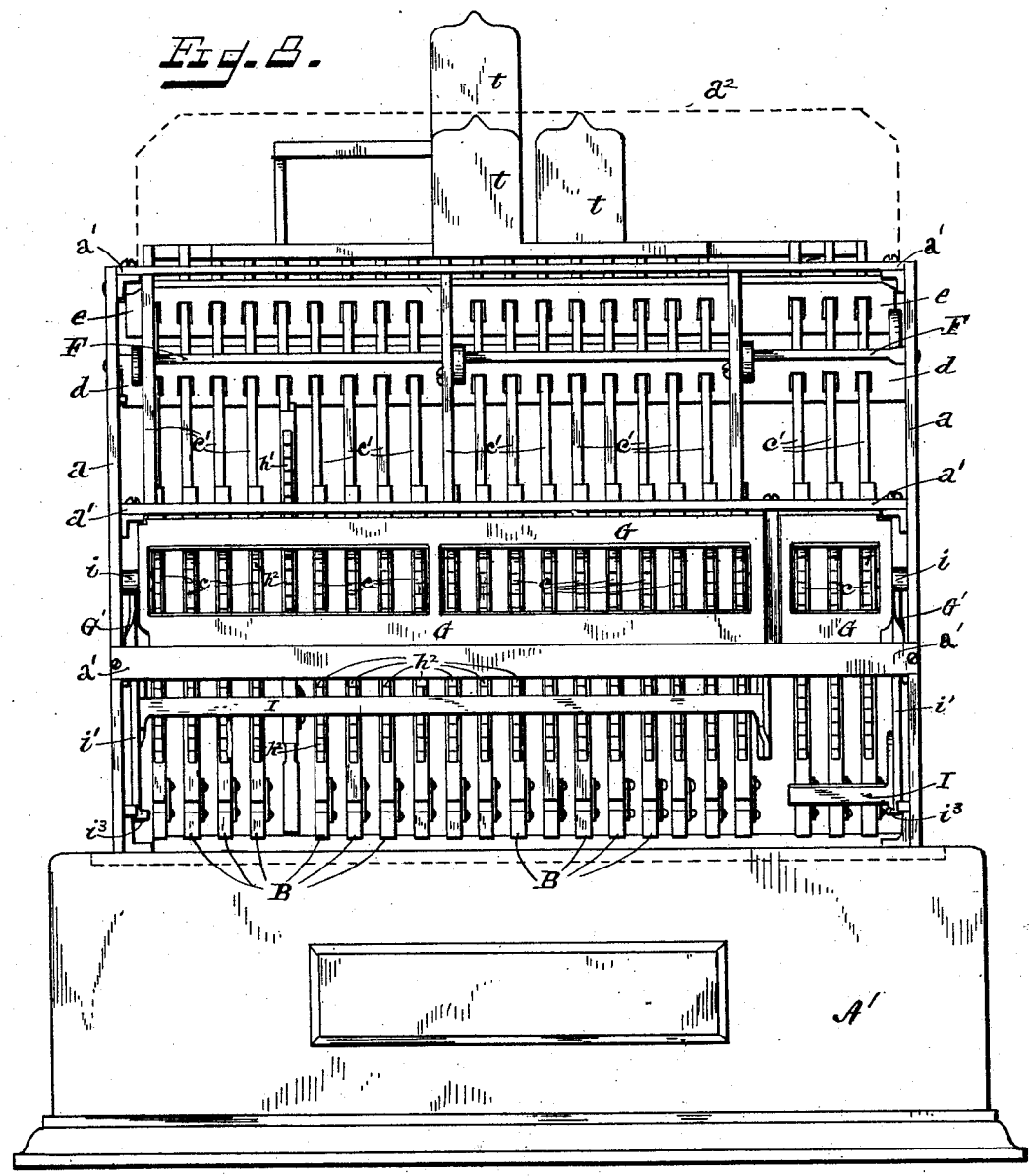

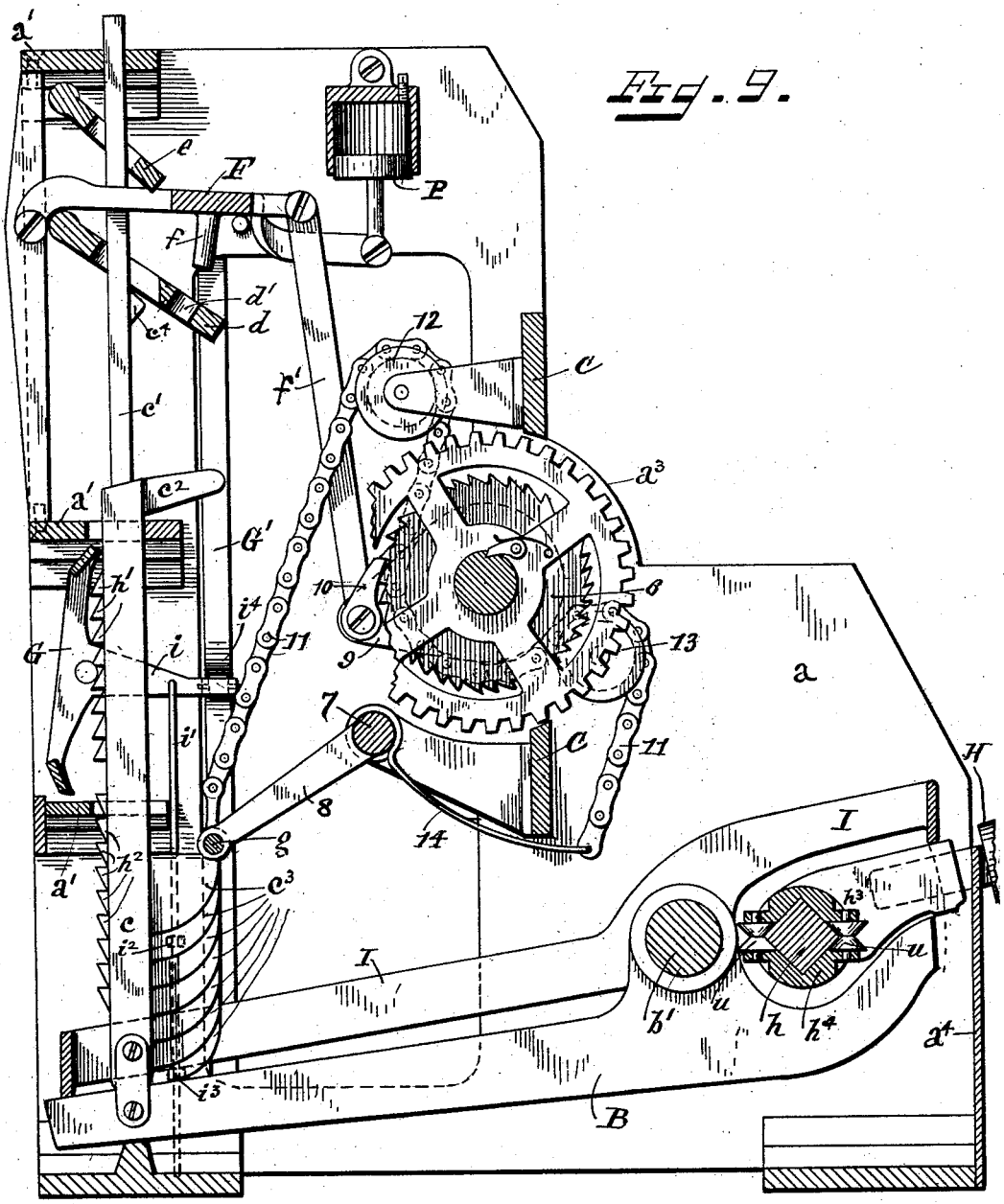

(No Model.) 11 Sheets—Sheet 8.
J. F. PFEFFER.
CASH REGISTER AND INDICATOR.
No. 468,944. Patented Feb. 16, 1892.
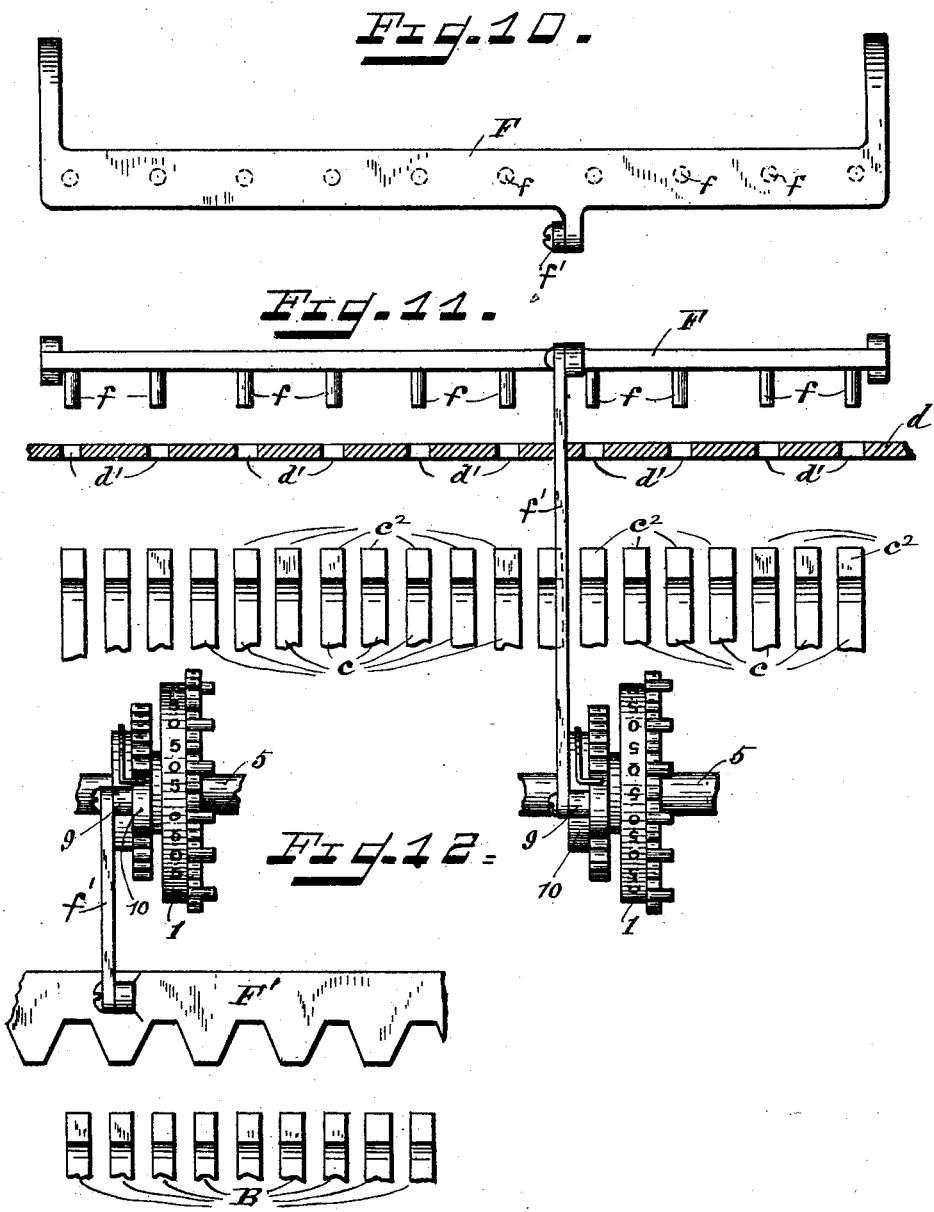

(No Model.) 11 Sheets—Sheet 9.
J. F. PFEFFER.
CASH REGISTER AND INDICATOR.

No. 468,944. Patented Feb. 16, 1892.

Witnesses
Inventor
By John F. Pfeffer
Atty (No Model.) 11 Sheets—Sheet 10.
J. F. PFEFFER.
CASH REGISTER AND INDICATOR.
No. 468,944. Patented Feb. 16, 1892.
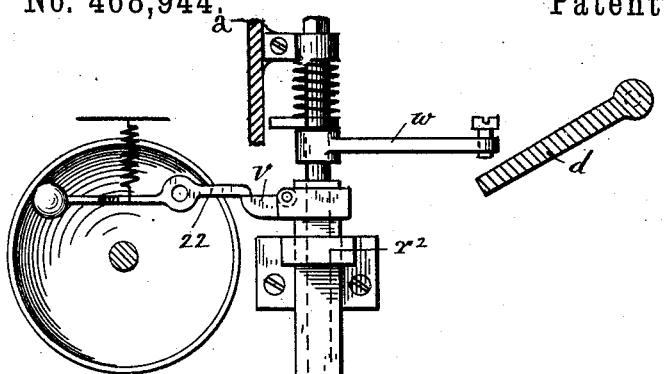
Fig. 15.
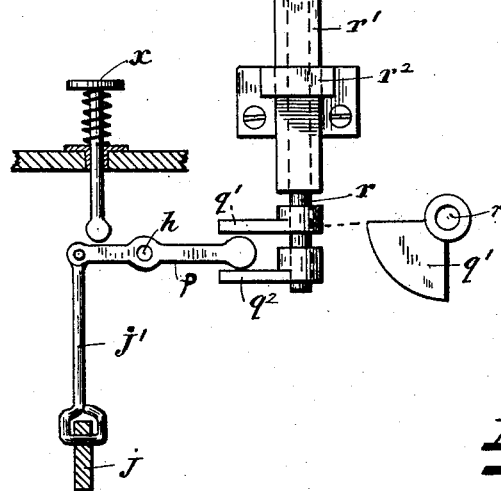
Fig. 16.
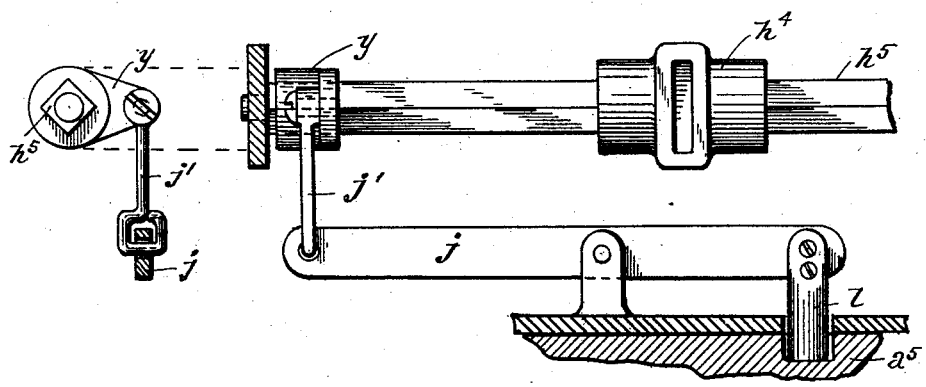
Witnesses
Frank Hantington
E. Hosea
Inventor
John F. Pfeffer
By R. M. Hosea
Atty.

(No Model.) 11 Sheets—Sheet 11.

J. F. PFEFFER.
CASH REGISTER AND INDICATOR.

No. 468,944. Patented Feb. 16, 1892.

UNITED STATES PATENT OFFICE.

JOHN F. PFEFFER, OF CINCINNATI, OHIO.

CASH REGISTER AND INDICATOR.

SPECIFICATION forming part of Letters Patent No. 468,944, dated February 16, 1892.

Application filed June 21, 1890. Serial No. 356,286. (No model.)

*To all whom it may concern:*

Be it known that I, JOHN F. PFEFFER, a citizen of the United States, residing at Cincinnati, in the county of Hamilton and State of Ohio, have invented new and useful Improvements in Cash-Registers, of which the following is a specification.

My invention relates to cash-registers, one of its main objects being to simplify and economize their construction and enhance their efficiency.

To this end my invention consists, first, in a cash-register constructed in two main portions—that is to say, first, the prime moving mechanism, such as the keys and their immediate connections including the indicator stems and tablets mounted complete upon the main frame, and, second, the register-wheels and their immediate connections for receiving and transmitting the initial power to and between themselves, mounted complete upon a distinct and separable portion of the frame, these two main elements being individually complete and independent, yet brought into operative connection by securing the two portions of the frame together and detachably connecting the half-unit mechanism to a pawl-carrier of the five-cent wheel.

This construction allows the manufacture and complete adjustment of each portion as a separate entity, also facilitates the repair or substitution of parts damaged in use.

My invention further consists in the construction and arrangement of the registering mechanism, whereby the machine is made a "fractional adder"—that is to say, in combining with the registering-wheel indicating a given multiple a fractional wheel indicating the half of said multiple, and in the construction and arrangement of the initial power-giving mechanism and keys with reference to their selective function in respect to this result—that is, of registering the fractional numbers.

It consists, also, in an improved key-locking mechanism whereby the entire completion of a key action once begun in either direction is compelled.

It consists, further, in a construction and arrangement of the key mechanism whereby the key system is operable by a single detachable handle, which may be removed and kept by the appointed operator of the machine, leaving the machine incapable of being operated or tampered with in the intervals of use.

It further consists in an improved key-arresting device whereby the selective actuation of any one of the series of keys in a group prevents the actuation of any other of the group until the main key is returned to its original position.

It further consists in a construction and arrangement of the cash-drawer and in the combination of a change-till therewith and its operative mechanism.

It consists, lastly, in certain improvements in constructive detail, simplifying and rendering more efficient the several operative parts, tending to enhance the efficiency of the entire mechanism, all as hereinafter more fully pointed out.

Mechanism embodying my invention is illustrated in the accompanying drawings, in which—

Figure 2:
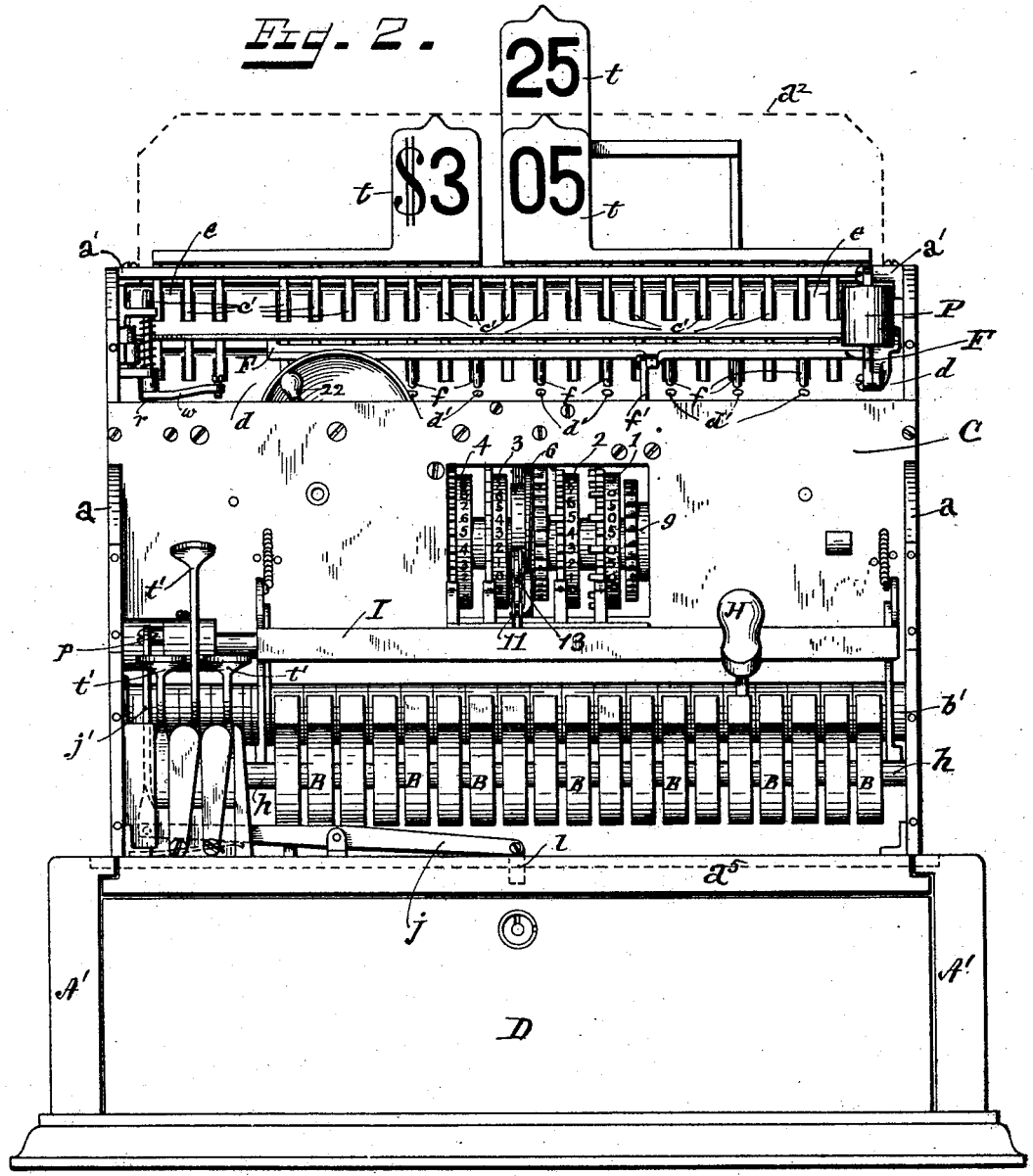
Figure 3:
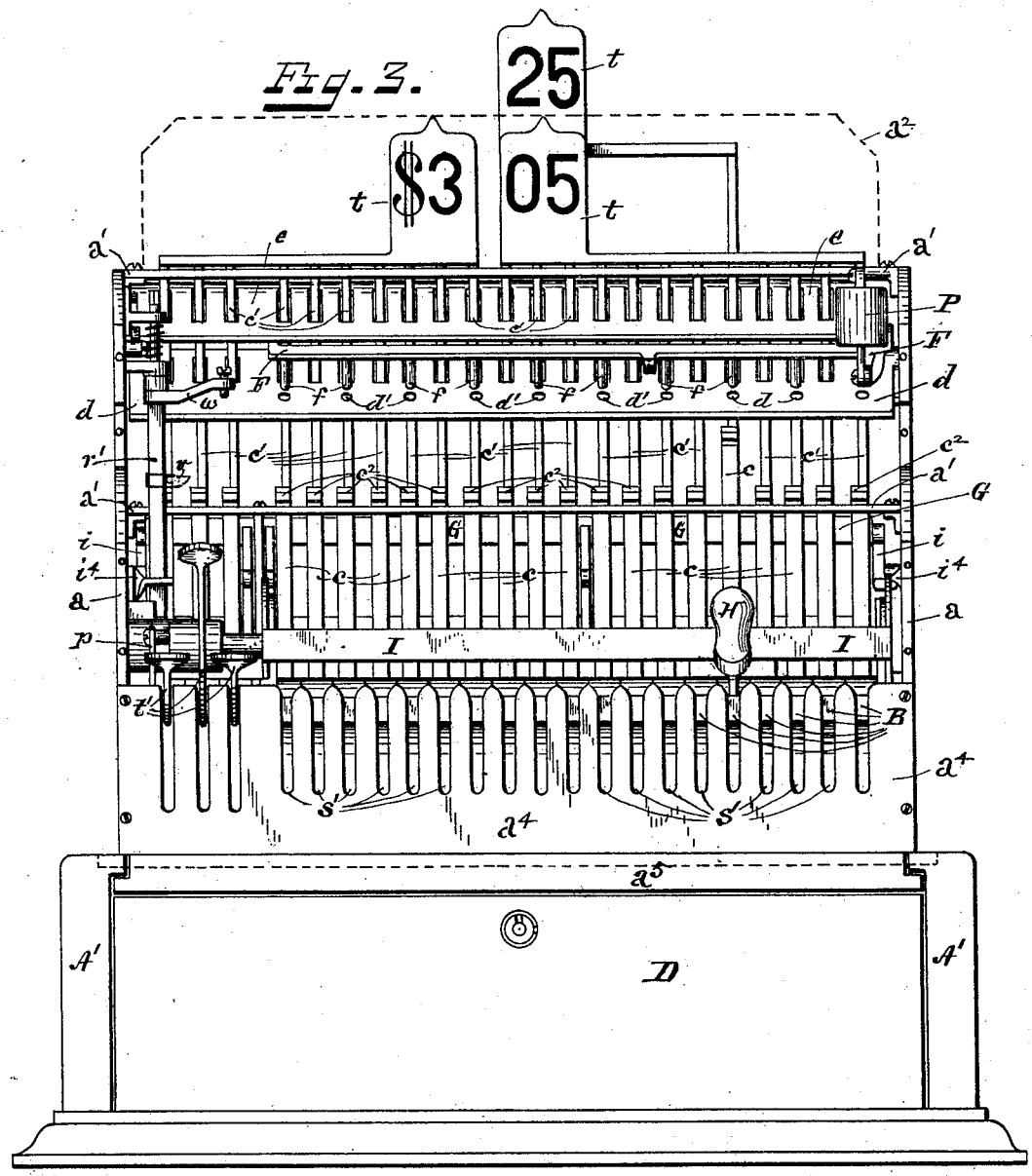
Figure 14:
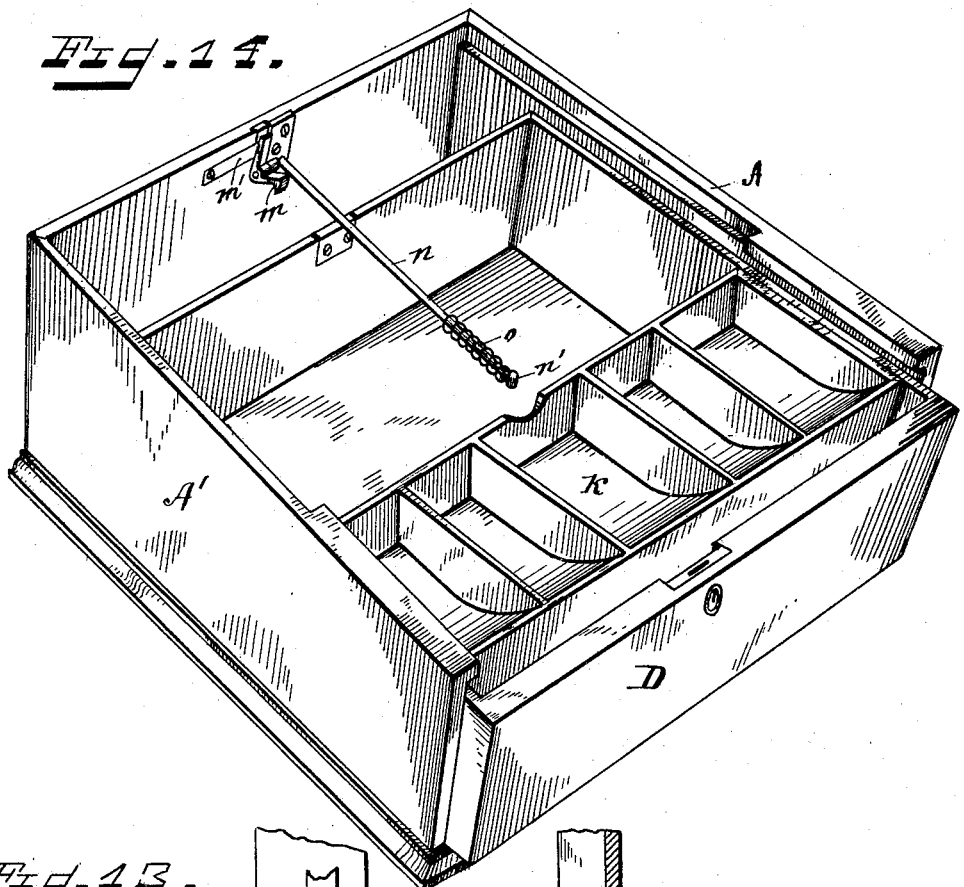
Figure 13:
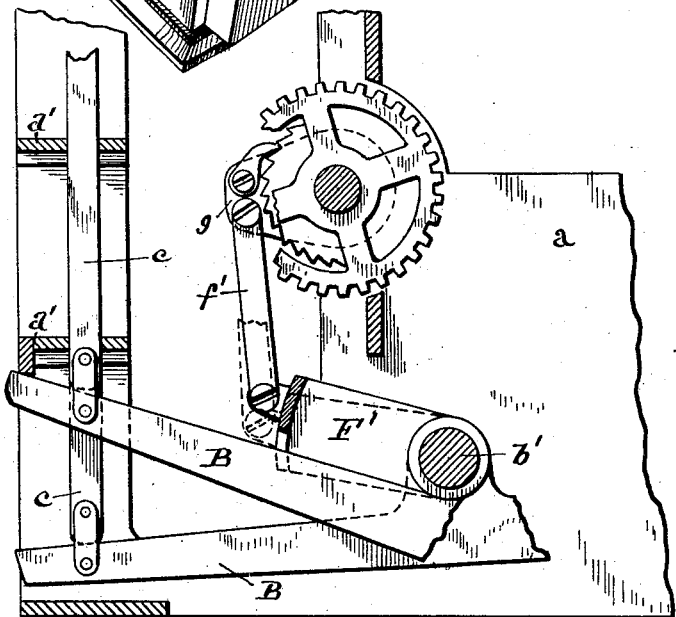
Figure 17:
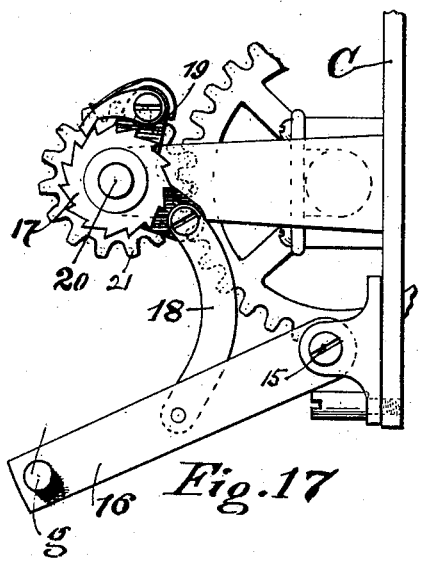
Figure 18:
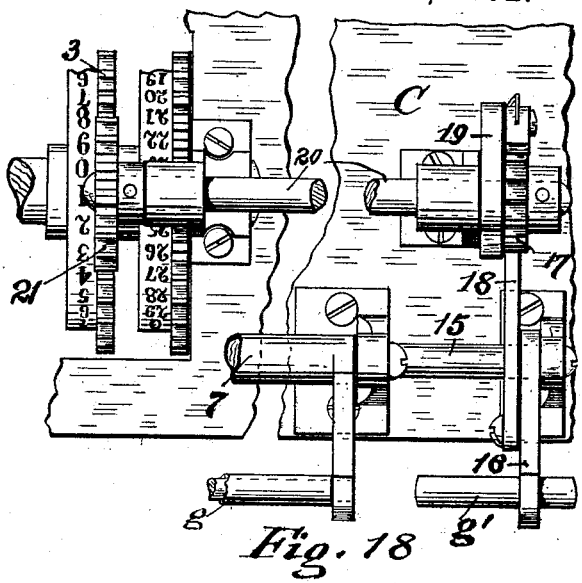
Figure 19:
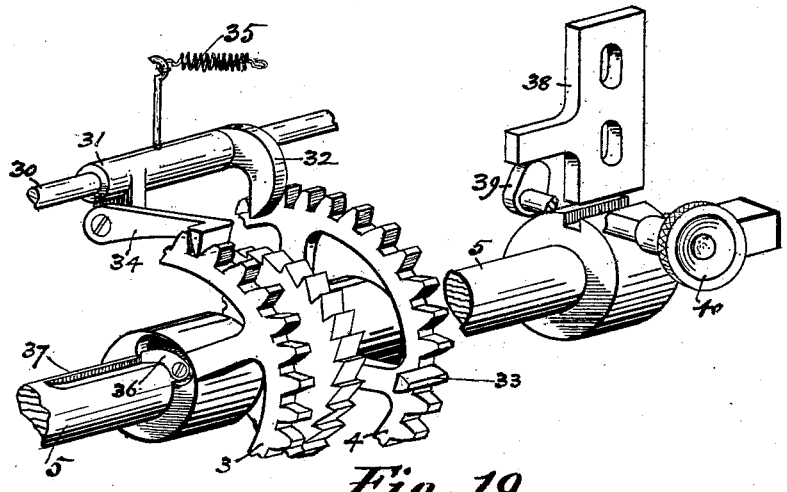

Figure 1 is a front elevation of the machine complete; Fig. 2, a similar front elevation with the front covering-plates removed, showing the removable frame-plate containing the register-wheels and their immediate connections in position in the main frame; Fig. 3, a front elevation with the detachable frame-plate and registering mechanism removed; Fig. 4, a side elevation of the machine sectioned through the cash-drawer to show the construction and operating mechanism; Fig. 5, a rear detached view of the removable frame-plate with attached register mechanism; Fig. 6, a detail view showing a modification in the construction of the register-wheel shaft and the mounting of the register-wheels thereon; Fig. 7, a detail view showing a modification of the construction and arrangement of the yokes for operating the register-wheel pawls; Fig. 8, a rear elevation of the machine from which the registering mechanism has been removed; Fig. 9, a detail side elevation of the machine, partly in section, showing the constructive relations of the key system, the registering devices, the lifting-standards, locking device, tablet-stems, pivoted wings, motion-regulating device, and the connecting mechanism for operating the fractional or "hundredths" wheel; Fig. 10, a plan view of the auxiliary wing employed for actuating the fractional or hundredths wheel; Fig. 11, a rear elevation of the same, showing its operative connections and relations with the pawl-carrier and ratchet-wheel, also a corresponding longitudinal section of the wing immediately below, showing the relation of the projections of the former to the apertures of the latter and the relations of the standards and operating-brackets to both; Fig. 12, a detail partial elevation of a modification of the device for operating the fractional or hundredths wheel; Fig. 13, a detail partial side elevation of said modified construction; Fig. 14, a perspective view of the drawer and its containing casing with the sliding lid removed; Fig. 15, a detail elevation of the mechanism for operating the principal drawer-bolt and tripping the bell signal; Fig. 16, a front elevation of a modified construction of the handle guide-bar utilized as a motor for operating the cash-drawer bolt; Figs. 17 and 18, side and rear views, respectively, of the mechanism for operating the dollar-wheel; Fig. 19, a detail perspective view of the carrying and resetting mechanism.

The invention of which the following is a specification is in some respects in the nature of an improvement upon the type of cash-registers shown in Letters Patent No. 422,828, issued to me March 4, 1890. In the type of registers referred to the distinguishing features of the operative mechanism are a system of key-levers arranged side by side upon a common horizontal pivot and acting in groups, respectively, upon horizontally-pivoted yokes, whose movement, according to the degree of oscillation imparted by a particular key, is transmitted through pawls or otherwise to register-wheels duly having appropriate numbers on their faces exhibited through peep-holes of the casing. The register-wheels are provided with interconnecting transmitting or "carrying" mechanism, whereby the tens of the unit designation are carried to the next higher wheel in series.

So far as I employ in the present invention the features common to this type of machines I shall omit a detailed description.

In the cash register and indicator herein described I divide the horizontal series of key-levers into two successive groups, the first registering the amounts, increasing by an increment of five cents consecutively from five to ninety-five cents, and the second registering dollars up to hundreds, and other key-groups may be added, if required.

The present description and drawings, however, being illustrated merely, are based upon a machine intended for small retail establishments, where the amount to be registered at any one time rarely exceeds a few dollars, so that the second or dollar group contains but three keys, indicating one, two, and three dollars consecutively, larger amounts being registered by repeating the action of a dollar-key. The register-wheels—four in number—are placed side by side upon a common shaft or stud and register, respectively, half-dimes as units; dimes or tens (from 1 to 9) dollars, (1 to 9;) and tens of dollars, from ten dollars to three hundred dollars. These wheels are provided with intertransmitting mechanism, whereby the machine is made a "total-adder."

The specific construction and arrangement is as follows: The half-dime or five-cent wheel being labeled in consecutive spaces 5 0 5 0, &c., corresponding with its cog-teeth, is provided with a lateral transmitting-tooth opposite each alternate or 0 space, so as to actuate the next higher wheel and carry the tens to the higher wheel at each second-space movement. The dime or tens wheel transmits similarly at each tenth-space movement to the dollar-wheel, and the dollar-wheel at each tenth-space movement similarly to the ten-dollar wheel. In this machine the driving-power is given to the register-wheels in series at alternate portions of the key-movement—that is to say, the half-dime wheel is actuated at and by the direct or downward movement of the keys—the dime-wheel at the indirect or return movement of the keys, the dollar-wheel at the direct movement, &c. The object of this arrangement is to enable the register-wheels as a complete and integral system to maintain a full and exact registry of the increasing total of the entire action of the machine as the respective wheels are operated to increase said total from time to time.

This preliminary explanation is designed to facilitate an understanding of the details following, of which I will describe first the main frame embodying the key-system and its parts and then the detachable plate containing the registering mechanism.

Referring now to the drawings, A designates the main frame-work of the machine, consisting of side pieces $a$ $a$, rear cross-braces $a'$ $a'$, a base $A'$, in which the drawer D is fitted to slide horizontally in suitable guides, a covering $a^2$, provided with a central slot through which the tablet-indicators $t$ are protruded upward, and a front plate $a^3$, provided with "peep-holes" $b$, for reading off the totals shown upon the register-wheels.

Where, as in the case here illustrated, an independent handle H is employed for actuating collectively any one of the groups of keys, a lower front plate $a^4$ is provided, having a horizontal slot $s$ for the lateral movement of the handle H, vertical guide-slots $s'$, opposite the respective key-lever, for the downward movements of the handle, and a series of numbers stamped or otherwise made visible upon said plate above and opposite the guide-slots, as shown, corresponding with and indicating the values of the keys, respectively. The base $A'$ and the contained drawer D project forward of the front plate $a^4$ and are provided with a sliding cover $a^5$, adapted to cover the projecting portion of the drawer D and to slide inward beneath the mechanism of the machine. Pivoted upon a common transverse shaft or stud $b'$, Fig. 9, within the upper portion of the main frame and casing, is the series of key-levers B, extending rearward in the usual manner. These may extend forward and outward and terminate in finger-tips $t'$ in the usual manner, as I have shown for purposes of illustration, in the dollar-keys occupying the three left-hand places in the entire series of keys as viewed from the front. I prefer, however, in the class of machines of which the present is an illustration to terminate the keys abruptly in front within the front plate $a^4$, as shown in Figs. 1, 2, 3, and 9, and provide an independent handle H and actuating connections hereinafter described. The keys B carry at the rear the vertical standards $c$, having tablet-stems $c'$ vertically telescoped therein. The standards $c$ are guided in the rear cross-bars $a'$ of the frame and terminate above in brackets $c^2$, which, in elevating, act upon a pivoted "wing" $d$ to operate the bell-trip, &c., and the tablet-stems $c'$ are provided with lateral projections $c^4$, which engage in and upon a second wing $e$, by which they are retained in their elevated positions in the manner common in this type of machines. The standards $c$ are also provided with lateral brackets $c^3$ to engage with a cross-bar $g$ of the yoke-arms 8 in this type of machines for the purpose of giving the proper rotation to the dime register-wheel. In the present case, however, the brackets $c^3$ are graded in height in series of pairs to engage the cross-bar, (except the five-cent key) at different relative periods of the common arc of travel of the keys—that is to say: Beginning with the half-dime key-standard at the right (as viewed from the front) the bracket $c^3$ of its standard $c$ is at the lowest relative point, so as not to engage the cross-bar $g$ of its yoke, but its standard acts only upon the wing F, as hereinafter described, by which its register-wheel is moved one notch or space. The bracket of the next or ten-cent key-standard occupies a next higher elevation to engage the cross-bar through the last or ninth increment of its arc of travel and moves the dime register-wheel one notch or space, but the bracket of the next or fifteen-cent key-standard stands at the same height as that of the ten-cent standard, and consequently moves the tens registering-wheel precisely the same distance—that is, one notch or space—the next two in series operating it two notches, and so on, in pairs throughout the entire group. The odd half is in every such case registered upon the five-cent register-wheel by the independent action of the odd-numbered keys, each of which (except in the case of the five-cent key) having the double function of actuating the five-cent key to register the odd half upon its direct and the tens-digit upon the dime-wheel upon its return motion. In such case if the register indicates an odd half at the beginning the carrying of the resulting tens to the dime-wheel is performed before the tens-digit is registered, thus preserving always the correct grand total.

The mechanism by which this selective action of the odd-numbered keys throughout the series is accomplished is as follows: Above the wing $d$, pivoted immediately behind and extending forward over and beyond the same in a position just clearing its upward limit of travel is a third wing F, which for convenience we may refer to as the five-cent wing. Projecting downward from the under side of this wing in line with the bracket $c^2$, respectively of each odd-numbered key-standard including the five-cent standard, are short stems $f$, and through the wing $d$, in line with the stem $f$, respectively, are perforations $d'$, sufficiently large to enable the wing $d$ to pass upward and clear the stems $f$ without contact. (See Figs. 9, 10, and 11.) The stems $f$ project far enough downward to be engaged by the respective standard-brackets $c^2$ of the keys representing odd multiples of five, which alternate with the others of the group and elevate the wing F a given distance which, by means of a link $f'$, connecting the outer end of the wing to the wrist of a loose crank-arm 9, carrying a pawl 10, operates the five-cent wheel one notch. It will thus be seen that each odd-numbered key actuates the five-cent register-wheel one notch or space on its direct movement and (excepting in the case of the five-cent key) carries up the cross-bars $g$ of the yoke and actuates the dime register-wheel on its return. The wing F is provided with an air-piston and cylinder P to regulate its movement and prevent injurious impact.

Figs. 12 and 13 illustrate a modification of structure, in which there is substituted for the wing F a horizontal yoke F', pivoted to the key-lever pivot-stud $b'$, and lying across and above the keys in rear of said stud. The lower edge of the yoke lying across the keys is dentated, as shown in Fig. 12, so that each even-numbered tens-key may pass up into a recess without raising the yoke, while each odd or fractional key carries up the yoke during the final increment of its arc of upward movement. The link $f'$ being attached to the yoke, its action on the five-cent wheel is the same as that of the wing F.

The key-locking function of the machine is performed by the following mechanism, Fig. 9: Each standard $c$ is provided with the double series of ratchet-teeth $h'$ $h^2$, the upper set $h'$ facing downward and the lower set $h^2$ facing upward at the rear side of each standard. Behind and engaging alternately with these teeth respectively is a rectangular locking-frame G, pivoted midway laterally at its ends, and by means of its upper and lower sides engaging alternately the upper and lower set of teeth of all the standards of a group in common, somewhat after the manner of a "verge" in clock-escapement mechanism.

The locking-frame G is operated in the present case by connection with a yoke I, consisting of a rectangular frame pivoted to the key-pivot $b'$ and lying horizontally across the rear ends of all the keys, extending forward at the sides of the keys and across in front just beyond the front ends of the key-levers B, and just above the same, so as to clear the handle H. When any one of the keys is depressed in front and raised in the rear, the yoke is oscillated with the key and handle. The connection between the locking-frame G and oscillating yoke I may now be explained. One of the sides of the locking-frame G is extended forward centrally, forming a T-lever $i$, Fig. 9, and from this extension depends a link-rod $i'$, adjacent to the side of the yoke I, and carries two stops $i^2$ $i^3$, projecting over into the path of the yoke, one above and the other below, by which the yoke, when near the upper limit of its oscillation, raises the T-lever $i$, thereby bringing the lower engaging edge of the locking-frame G into contact with the rear of the standards $c$, and when near the lower limit of its oscillation carries the T-lever $i$ down, thereby bringing the upper edge of the locking-frame into contact with the standards. The locking-frame G is held in such ultimate positions by a fixed spring-bar G', placed vertically at one side of the frame of the machine and bearing against the T-lever $i$. A small cam or wedge-shaped protuberance $i^4$ on the spring-bar, in connection with the resilient action of the bar, retains the arm $i$ and locking-frame G in ultimate positions, but permits it to be forced from one position to the other over the cam $i^4$. Each group of keys is similarly provided with a locking-frame and operating mechanism.

The general purpose of the locking-frame G, in co-operation with the standard $c$, is to permit a key-lever B to be moved, but to prevent its return until a movement begun in either direction is completed; but the action of the key-lever by raising the rear end depresses the front end of the yoke-frame I, which, following down the handle H as it enters the guide-slot $s'$, thereby fixes the relation of the handle to the key for the time being and compels the complete action of the key and its return to its original position before the handle can be applied to another key. The front of the yoke I when depressed also presents a shield across the slots $s'$, preventing the application of the handle to another key.

The construction and operation of the handle in relation to the keys is as follows: It consists of a projecting handle H, having a sliding pivotal connection with a cross-bar $h$, placed just over the keys in front of their common pivot. For convenience and ease in shifting the handle laterally to engage any one of the several keys by depressing contact at their front ends, its pivotal connection with the bar $h$ may be a sliding cross-head $h^4$, provided with friction-rollers; but this is not essential. I also prefer to construct the handle proper separable from its pivotal cross-head connection, so that it may be removed and carried by the proper operator, in order that the register cannot be tampered with in his absence; but this is not essential.

In Fig. 9 of the drawings I have shown the handle H socketed in an extension $h^3$, pivotally attached to a cross-head $h^4$, carried upon a squared bar $h$ as a cylindrical sleeve, upon which the extension $h^3$ has a pivotal engagement, the sleeve sliding laterally upon the bar. Friction-rolls $u$ may be fitted in the sleeve to the front and rear edges of the bar to insure a free sliding action of the sleeve, and the extension $h^3$ is recessed to admit the insertion of a detachable handle.

It remains to describe, in connection with this portion of the mechanism, the drawer and its operating devices.

As stated, the drawer D is placed beneath the key mechanism in sliding bearings in the base A', projecting in front of the frame-plates a convenient distance to enable a sliding top or lid $a^5$ to be thrust back, exposing a "change-till" $k$, mounted in sliding bearings within the main drawer D. The relation of these parts will be most clearly seen in Figs. 4 and 14. The sliding cover $a^5$ has at the rear a downward ledge $a^6$ and is normally held in locked position by a vertical sliding bolt $l$, whose actuation will be presently explained. The main drawer D is normally held locked at the rear by a bell-crank hook-catch $m$, pivoted to the casing A', engaging over and at the inside of the rear wall of the drawer. A rod $n$, secured in the rear wall of the casing A', passes horizontally forward above the main drawer D and through an aperture of the ledge $a^6$ of the sliding lid $a^5$, and is embraced forward of said ledge by a spiral spring $o$, bearing against the ledge $a^6$ at one side and a terminal head $n'$ of the rod at the other. The bell-crank catch $m$ is held in locking position, as shown, by a spring $m'$, and its forward end is beveled to allow the drawer to engage automatically when pushed back. Similarly the lower edge of the bolt $l$ is beveled to allow the sliding lid $a^5$ to engage and lock automatically when drawn forward. The spring $o$ is in compression when the lid $a^5$ is drawn forward. It will be seen that when the bolt $l$ is raised the lid $a^5$ at once slides back by the action of the spring $o$, exposing and releasing the till $k$, the main drawer, however, remaining locked. If it be desired to release the main drawer, the lid $a^5$ is shoved back until it strikes the upper arm of the bell-crank catch $m$, which is thus tripped and the main drawer released and can be drawn forward.

The mechanism for actuating the bolt $l$ (shown in Figs. 2, 4, and 15) is as follows: The bolt $l$ is passed through a guide-aperture centrally in the upper wall of the base A' and attached to a horizontal operating-lever $j$, Fig. 2, extending laterally to one side beyond the key-levers, where it is pivoted by a link $j'$, Fig. 15, to an oscillating lever $p$, extending rearward and pivoted to any fixed portion of the machine. At the rear extremity of the lever $p$ it engages by contact between the upper and lower side projections $q'\ q^2$ of a vertical rod $r$. These projections are quarter-segments of a circle or otherwise sufficiently broad of surface to remain in engagement with the lever $p$ when the rod $r$ is rotated, as hereinafter explained. The rod $r$ passes up within an exteriorly-squared sleeve $r'$, held in guide projections $r^2$ of the frame. At a convenient point the sleeve $r'$ carries a hinged tripping-finger $v$ in the path of the bell-striker 22. The rod $r$ carries above the tripping-finger $v$ an actuating-handle $w$, which extends laterally over the wing $d$, whereby the action of the wing elevates the rod $r$, and thereby the drawer-cover $a^5$ is released and the bell sounded. By turning the arm $w$ aside out of the path of the wing $d$, these functions are not performed by the keys through the wing $d$, but by a push-button $x$, arranged in the case above the forward end of the lever $p$. The object in providing these alternate modes of actuating the drawer mechanism is to accommodate the preference of the operator and to enable the machine to be set accordingly. In connection with the drawer-operating mechanism the modification illustrated in Fig. 16 simplifies the construction, and is preferable when an operating-handle H is employed. In this case I prefer to attach the socket-piece $h^3$ directly to the sleeve $h^4$ and mount the same upon a square bar $h^5$, provided with cylindrical journals enabling it to rotate. At one end the bar $h^5$ carries a crank, upon whose wrist is attached the link $j'$, connected with the bolt-lever $j$. Thus the bolt $l$ is directly operated by the handle H and the wing $d$ may be entirely omitted.

All the parts thus far described are located upon the main or permanent portion of the frame, which, with such parts, constitutes an integral and divisible part of the machine.

The second and separable portion contains the registering-wheels and their immediate actuating mechanism mounted on a separable plate C, upon which this portion of the mechanism is carried, which fits between and is secured to the side pieces $a\ a$ of the frame and constitutes the inner front, having an aperture through which the register-wheels project, as shown in Fig. 2.

Referring now to the rear detached view of the plate shown in Fig. 5, the register-wheels 1, 2, 3, and 4 (designating respectively the half-dime or fractional wheel, dime or tens wheel, dollar or hundreds wheel, and ten-dollar or thousands wheel) are mounted side by side in consecutive order loosely upon a common shaft 5. Each of the register-wheels is provided with a peripheral series of cog-teeth spaced apart to correspond with the register-spaces of its indicating-periphery and with laterally-projecting teeth to engage with interconnecting pawl mechanism, whereby the movement of one is at the proper carrying-point transmitted to the next higher, as will be more fully described later. The five-cent or half-dime wheel 1 is provided at one side with a ratchet-wheel or set of ratchet-teeth, and at the opposite side, adjacent to the next wheel 2 in series, each second tooth of its cogged periphery projects laterally to engage the carrying or transmitting devices. Adjacent to the ratchet portion of the wheel 1 is a crank-arm 9, loosely centered upon the shaft 5 and carrying a spring-pawl 10, playing over the ratchet-teeth. Its wrist-pin or screw is detachably connected with the link $f'$, already described, which in turn is detachably connected with the wing F, and the five-cent wheel thus derives its motion from the wing by the direct action of the keys, as described. The link $f'$ is disconnected from the crank-arm 9 or from the wing F when the two main portions of the machine are separated. The dime or tens wheel 2 is provided upon the side opposite the five-cent wheel with ratchet-teeth, and adjacent thereto, upon an extension of its hub toward the next higher wheel 3, with a loose chain-wheel 6, carrying a pawl engaging upon the teeth of the ratchet-wheel, as shown in Figs. 5 and 6, which gives it motion, as follows: At the rear of the plate C, parallel to and below the shaft 5 in suitable journal-brackets, is a crank rock-shaft 7, carrying cranks 8, projecting rearward and connected across their outer extremities by the cross-bar $g$, forming a yoke which when the parts are together lies above and across the brackets $c^3$ of the standards $c$, and is elevated by any one of the standards against the resilient force of one or more springs $S^2$, coiled upon the shaft 7, having one end bearing against the plate C and the other lying in tension upon the cross-bar $g$ or upon one of the arms 8. The yoke thus mounted is the common intermediary mover by which all the dime group of keys B transmit their appropriate motion according to the relative heights of the brackets $c^3$ upon their lifting-standards to the tens-wheel 2. To the cross-bar $g$ is attached one end of a chain 11, passing thence upward over an idler-pulley 12, journaled upon a suitable bracket upon the plate C, thence downward under and in mesh with the chain-wheel 6, forward, upward, over, and downward from a second idler-pulley 13, Figs. 2 and 9, to the terminus of a bar-spring 14, projecting forward of the rock-shaft 7, whose tension holds the chain taut. It will thus be seen that the elevation of the cross-bar $g$, and consequent depression of the bar-spring 14, carries the chain 11 and rotates the wheel 6 backward and trails its pawl in reverse over the ratchet-teeth; but upon release of the keys the spring or springs $S^2$ impel the yoke and the key-standard downward, restoring the key to its normal position and operating the tens register-wheel. The reason, therefore, for the arrangement of the brackets $c^3$ at corresponding heights in pairs upon the standards $c$ will now be more apparent. For example, the twenty-cent key and the twenty-five-cent key have brackets $c^3$ at the same height upon their standards; but the mechanism operating the five-cent wheel being operated only by the odd-numbered keys the twenty-cent key operates upon the cross-bar *g* and the tens-wheel alone, while the twenty-five-cent key operates first—that is, upon its direct motion—upon the five-cent wheel through the wing *d* and connections and raises the yoke cross-bar 8, which upon the return to its original position operates the tens-wheel through the chain 11.

The dollar-group-operating mechanism is in effect a substantial duplicate of that of the dime group—a rock-shaft 15, crank-arm 16, and cross-bar *g'*, with spring $S^3$, all operated and operating in the manner described. It is connected, however, by a link 18 with a bell-crank 19, centered loosely upon a counter-shaft 20, carried in suitable bearings upon the plate C. Adjacent to the bell-crank 19 is a ratchet-wheel 17, operated by a trailing pawl carried upon the bell-crank 19, and at the opposite terminal of the shaft 20 is a spur-pinion 21, engaging with the cog-teeth of the register-wheel 3, thus giving it motion directly from the keys.

In the principal figures of the drawings I have shown a separate rock-shaft 15, on which is carried the crank 16 and cross-bar *g'*. This rock-shaft may be dispensed with and the crank-arm 16 carried loosely upon an extension of the rock-shaft 7, as shown in Fig. 7, the construction being otherwise the same. I have also shown in the drawings, Figs. 17 and 18, an independent counter-shaft 20 and gear 21 for transmitting the motion of the dollar-keys to the register-wheel 3. I may also modify this construction, as exhibited in Fig. 6, by placing the wheel 4 to run loosely upon a hub or sleeve 23 of wheel 3, extended loosely upon the shaft 5. The ratchet-wheel 17 is placed upon the sleeve 23, the other connections being same as described. The resetting-pawl of wheel 3 engages with shaft 5, but that of wheel 4 engages similarly with sleeve 23. The thousandths-wheel 4 is in the present case unprovided with operative mechanism, except the carrying or transmitting devices, which are the same as described in my said former patent. Above the register-wheels I place a counter-shaft of pivot 30, Fig. 19, on which I arrange small bell-crank-pawl carriers 31, the long arm of each being bent downward to lie in the path of a lateral tooth 33 upon one register-wheel, while its short arm carries a pivoted pawl 34, engaging the peripheral teeth of the adjacent register-wheel. A spring 35, connected to the frame-work of the machine, rotates the pawl-carrier against a suitably-arranged stop, (not shown,) restoring the bell-crank to its normal position after action of a tooth which raises the long arm and compels the pivotal pawl 34 to advance the higher register-wheel one tooth in the usual manner.

In order to restore the register-wheels back to a common position and show 0 at the indicating-apertures the registering-wheels, which run loosely upon a common shaft 5, are each provided with a pivotal pawl 36 at the side, engaging in a longitudinal ratchet, slot, or groove 37 in the shaft, so that upon turning the shaft in the normal direction of travel of the wheels the latter are "picked up," one after another, by their respective pawls, according to their relative radial positions at the time, until all engage the shaft in similar relations. A single revolution of the shaft therefore engages all the registering-wheels and carries them forward to the next zero position, this being effected by a crank or key applied to the squared end of the shaft 5. As a limit to this movement, a spring or gravity detent 38 is provided, operated by a cam-finger 39 upon a short pivot provided with a turning-button 40. A detent being temporarily released until the shaft 5 is started in rotation reseats itself in a groove of the shaft when a complete rotation is effected. The bell-signal, with its striker-arm, in this case is mounted upon the back of the plate C, as shown in Fig. 5, with its "trip" terminal 22 in the path of the tripping-finger upon the rod *r*, as already described.

I claim as my invention and desire to secure by Letters Patent of the United States—

1. In a cash-register, the combination of a half-unit key, a half-unit registering-wheel, a following series of whole and intervening half-unit keys connected in common to a units-wheel, a tens or multiple-units wheel or wheels connected with the unit and half-unit wheels in a single transmitting series, transmitting devices connecting said wheels consecutively in adding series, and a common independent actuating connection between said half-unit keys and the half-unit wheel, whereby the odd keys (above the initial half-unit key) register their whole units upon the units-wheel and register and maintain a correct grand total upon the series of registering-wheels in common, substantially as set forth.

2. In a cash-register, in combination with an integral series of keys progressing in value by halves of a given unit, a series of unit register-wheels and transmitting mechanism and an independent registering-wheel for such halves, a yoke or wing in transverse relation with the entire series of keys or key-standards, constructed with alternate depressions opposite the full-unit keys, by which said keys act independently of said yoke, but whereby said odd or half-unit keys actuate said yoke or wing, and connecting mechanism between said yoke or wing and the half-unit wheel, whereby the same is actuated by each odd or half-unit key in addition to the actuation of the unit register-wheel, substantially as set forth.

3. In a cash-register, the combination of an integral series of actuating-keys progressing in value by half-unit increments, a corresponding half-units, units, and tens wheel arranged in a single transmitting series, an actuating bar or yoke for selectively transmitting the action of said keys representing one unit and upward to the unit-wheel, and a second yoke or bar arranged to be actuated additionally by each odd or half key to operate the half-unit wheel for registering the half-units at the same movement of the keys, and independent carrying mechanism between the register-wheels in series, substantially as set forth.

4. In a cash-register, the combination of a series of actuating-keys, standards connected with and actuated by said keys, two series of ratchet-teeth upon each standard, each series facing in a direction opposite to the other, and a locking-plate horizontally pivoted adjacent to the standards and adapted to swing its upper and lower edges alternately into engagement with said series of teeth, respectively, substantially as set forth.

5. In a cash-register, the combination of a series of actuating-keys, standards connected with and actuated by said keys, two opposite series of ratchet-teeth, as described, upon each standard, a pivoted locking-frame adjacent to said standards and engaging the opposite teeth alternately, and a spring attached to the register-frame and arranged to hold said locking-plate in opposite ultimate positions, substantially as set forth.

6. In a cash-register, the combination of the actuating-keys, the toothed standards, the pivoted locking-frame, a central arm extending from said locking-frame, a side spring resting against said arm, and a double-inclined block or cam upon the spring to actuate and retain the arm in opposite directions, substantially as set forth.

7. In a cash-register, the combination of the actuating-keys, the toothed standards, the pivoted locking-frame, the central controlling-arm, the side spring provided with the wedge-cam, the key-yoke or wing, and the link attached thereto provided with stops and engaging the locking-frame to carry it over the central projection or apex of the wedge-cam, substantially as set forth.

8. In a cash-register, the combination of a series of actuating-levers and a sliding handle adapted to be brought into connection with any one of said keys at will, substantially as set forth.

9. In a cash-register, the combination of a series of actuating-levers, a sliding cross-head, and a detachable handle adapted to be attached to said cross-head and move the same laterally to act upon any key at will, substantially as set forth.

10. In a cash-register, the combination of a series of actuating-keys situated wholly within the containing frame, a sliding cross-head also wholly within the frame, and a detachable handle adapted to be inserted through a longitudinal slot of the frame or cover to engage the cross-head and shift the same laterally to act upon any key, substantially as set forth.

11. In a cash-register, in combination with a series of key-levers and a laterally-adjustable handle for operating the same, a rectangular yoke pivoted in or approximately in the axis of the key-levers, lying across the key-levers in rear of the axis and projecting beyond the front line of the key-levers forward of the axis, substantially as set forth.

12. In a cash-register, in combination with a series of keys and a laterally-adjustable handle for operating the same, a front guide-plate having a horizontal slot for the insertion and lateral adjustment of the handle, and short vertical guide-slots opening from below into the same for the actuation of each key, substantially as set forth.

13. In a cash-register, in combination with a series of key-levers and a guide-bar arranged above the projecting front ends of said key-levers, a cross-head sliding upon said guide-bar, and a handle or hand-lever adapted to be attached to said cross-head and shifted laterally thereby to engage and depress the several key-levers, substantially as set forth.

14. In a cash-register, in combination with a series of register-wheels indicating tens and a series of keys marked in successive increments of five, (as 10, 15, 20, 25, &c.,) but arranged in pairs to register duplicates of a given ten, (as 10 10, 20 20, 30 30, &c.,) a fives-wheel at the base of said series of register-wheels, and a yoke or cross-bar arranged above said keys and provided with a series of recesses whereby each first key of a pair leaves the yoke untouched, but each second ten-key of a pair, besides operating its appropriate tens register-wheel, also operates the independent yoke to register the odd five, substantially as set forth.

15. In a cash-register, the combination of a register-wheel, an actuating-key, a ratchet-wheel connected mediately with said register-wheel, a chain-wheel connected with and adjacent to said ratchet, a pawl upon said chain-wheel engaging the ratchet, a pivoted crank-arm actuated by said key, a chain attached to said crank-arm and carried in reverse by means of idler-pulleys over said chain-wheel and a spring-extension of said crank-arm attached to the opposite end of the chain, and actuating-springs attached to fixed portions of the frame and operating the crank-arm in opposition to the key, whereby the action of the key trails the pawl over the ratchet and upon release of the key the actuating-spring moves the ratchet-wheel and its attached register-wheel, substantially as set forth.

16. The combination, in a cash-register, of a series of register-wheels for registering tens, a series of keys for actuating the same, a ratchet-wheel for operating the register-wheels, a chain-wheel carrying a pawl for operating said ratchet, a pivoted yoke lying above the keys and operated selectively thereby, a chain passing over said chain-wheel, attached at one end to said yoke and at the other to a spring-crank extension at the rear of the yoke-pivot, idler-pulleys for reversing the action of the chain, and a spring attached to the frame of the machine and actuating said yoke oppositely to the action of the key, substantially as set forth.

17. In a cash-register, in combination with a system of tens-keys in pairs duplicating each tens-register upon a corresponding series of register-wheels upon release or back motion of the keys, a fives register-wheel constituting the base of the wheel series, and an independent actuating mechanism between the series of keys and the fives-wheel operated by the initial direct movement of each second key of a pair, whereby the intervening five between each ten and the next higher ten is registered prior to the registering of the ten of which it forms a part, as 5+20 intervening beween 20 and 30, substantially as set forth.

18. In a cash-register, the combination of a sliding cash till or drawer, a sliding lid for said drawer, and a lock for retaining said drawer in the case, having a trip arranged in the path of the sliding lid, whereby upon moving the lid the main drawer is released, substantially as set forth.

19. In a cash-register, the combination of a sliding cash-drawer, a self-engaging catch for holding the drawer closed, a sliding lid for said drawer, and an actuating-spring for receding said lid mediately attached to the casing, and a trip for said drawer-catch arranged in the path of the lid, substantially as set forth.

In testimony whereof I have hereunto set my hand in the presence of two subscribing witnesses.

JOHN F. PFEFFER.

Witnesses:
L. M. HOSEA,
ELLA HOSEA.